United States Patent
Park et al.

(10) Patent No.: US 9,756,612 B2
(45) Date of Patent: Sep. 5, 2017

(54) METHOD AND APPARATUS FOR TRANSMITTING AND RECEIVING FRAME ON THE BASIS OF FREQUENCY SELECTION TRANSMISSION

(75) Inventors: Jong Hyun Park, Anyang-si (KR); Hyang Sun You, Anyang-si (KR); Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 14/237,539

(22) PCT Filed: Aug. 7, 2012

(86) PCT No.: PCT/KR2012/006255
§ 371 (c)(1),
(2), (4) Date: Feb. 26, 2014

(87) PCT Pub. No.: WO2013/022254
PCT Pub. Date: Feb. 14, 2013

(65) Prior Publication Data
US 2014/0204891 A1    Jul. 24, 2014

Related U.S. Application Data

(60) Provisional application No. 61/556,185, filed on Nov. 5, 2011, provisional application No. 61/515,970, filed on Aug. 7, 2011.

(51) Int. Cl.
*H04W 4/00* (2009.01)
*H04W 72/02* (2009.01)
(Continued)

(52) U.S. Cl.
CPC .............. *H04W 72/02* (2013.01); *H04L 1/18* (2013.01); *H04L 5/00* (2013.01); *H04L 5/006* (2013.01);
(Continued)

(58) Field of Classification Search
CPC ... H04W 72/02; H04W 56/00; H04W 72/085; H04W 4/08; H04W 72/0446; H04L 1/18;
(Continued)

(56) References Cited

U.S. PATENT DOCUMENTS

2006/0280153 A1    12/2006  Kwon et al.
2007/0298742 A1*   12/2007  Ketchum ............. H04B 7/0617
                                                        455/186.1
(Continued)

FOREIGN PATENT DOCUMENTS

CN          1977518 A      6/2007
JP       20033348641 A    12/2003
(Continued)

OTHER PUBLICATIONS

"802.11n-2009, Amendment 5: Enhancements for Higher Throughput", published Oct. 29, 2009 by IEEE, 3 Park Avenue, New York, NY 100016-5997,.*

*Primary Examiner* — Gregory Sefcheck
*Assistant Examiner* — Majid Esmaeilian
(74) *Attorney, Agent, or Firm* — Dentons US LLP

(57) ABSTRACT

A method for communicating in a wireless local area network is provided. The method includes receiving allowed channel information from a second station, the allowed channel information indicating whether at least one channel is allowed for transmission, selecting, by the first station, at least one operating channel from the at least one allowed channel, and transmitting, by the first station, frames on the at least one selected operating channel. The allowed channel information comprises an allowed channel bitmap. Each bit of the allowed channel bitmap indicates each channel is allowed for the transmission.

4 Claims, 10 Drawing Sheets

(51) Int. Cl.
*H04W 56/00* (2009.01)
*H04W 72/08* (2009.01)
*H04L 1/18* (2006.01)
*H04L 5/00* (2006.01)
*H04W 72/04* (2009.01)
*H04L 27/26* (2006.01)
*H04W 4/08* (2009.01)
*H04B 7/0417* (2017.01)
*H04B 7/0452* (2017.01)

(52) U.S. Cl.
CPC .......... *H04L 5/0007* (2013.01); *H04L 5/0037* (2013.01); *H04W 56/00* (2013.01); *H04W 72/085* (2013.01); *H04B 7/0417* (2013.01); *H04B 7/0452* (2013.01); *H04L 27/2602* (2013.01); *H04W 4/08* (2013.01); *H04W 72/0446* (2013.01)

(58) Field of Classification Search
CPC ......... H04L 5/00; H04L 5/0007; H04L 5/006; H04L 27/2602; H04B 7/0417; H04B 7/0452
USPC .......................................... 370/329
See application file for complete search history.

(56) References Cited

U.S. PATENT DOCUMENTS

| | | | |
|---|---|---|---|
| 2008/0062178 A1 | 3/2008 | Khandekar et al. | |
| 2008/0316981 A1* | 12/2008 | Trainin | H04L 5/1453 370/338 |
| 2011/0002219 A1* | 1/2011 | Kim | H04B 7/0417 370/203 |
| 2011/0075607 A1* | 3/2011 | Kim | H04B 7/0417 370/328 |
| 2011/0075759 A1 | 3/2011 | Seok | |
| 2011/0235533 A1 | 9/2011 | Breit et al. | |
| 2011/0243025 A1 | 10/2011 | Kim et al. | |
| 2012/0063439 A1 | 3/2012 | Seok | |
| 2012/0113952 A1* | 5/2012 | Kneckt | H04W 72/0406 370/330 |
| 2012/0177017 A1* | 7/2012 | Gong | H04W 74/0816 370/338 |
| 2012/0243485 A1* | 9/2012 | Merlin | H04W 28/20 370/329 |
| 2013/0058239 A1* | 3/2013 | Wang | H04B 7/0417 370/252 |
| 2014/0092860 A1* | 4/2014 | Kneckt | H04W 72/1205 370/329 |
| 2014/0112246 A1* | 4/2014 | Park | H04W 74/002 370/328 |
| 2015/0117383 A1 | 4/2015 | Liu et al. | |
| 2015/0319780 A1 | 11/2015 | Seok | |
| 2016/0056928 A1 | 2/2016 | Seok | |

FOREIGN PATENT DOCUMENTS

| | | |
|---|---|---|
| JP | 2008-510326 A | 4/2008 |
| JP | 2009219117 A | 9/2009 |
| JP | 2010041581 A | 2/2010 |
| JP | 2011139515 A | 7/2011 |
| JP | 2011525085 A | 9/2011 |
| JP | 2012511860 A | 5/2012 |
| JP | 2012531793 A | 12/2012 |
| JP | 2013502157 A | 1/2013 |
| JP | 2013505645 A | 2/2013 |
| KR | 10-2009-0012774 A | 2/2009 |
| KR | 1020090131398 A | 12/2009 |
| KR | 10-2010-0066347 A | 6/2010 |
| KR | 10-2010-0041235 A | 4/2011 |
| KR | 10-2011-0044717 A | 4/2011 |
| RU | 2378769 C2 | 1/2010 |
| WO | 2006083021 A1 | 8/2006 |
| WO | 2008041417 A1 | 4/2008 |
| WO | 2009154406 A2 | 12/2009 |
| WO | 2010044580 A2 | 4/2010 |
| WO | 2010068065 A3 | 6/2010 |
| WO | 2010120692 A1 | 10/2010 |
| WO | 2010150950 A1 | 12/2010 |
| WO | 2011019571 A1 | 2/2011 |
| WO | 2011035204 A2 | 3/2011 |

* cited by examiner

METHOD AND APPARATUS FOR TRANSMITTING AND RECEIVING FRAME ON THE BASIS OF FREQUENCY SELECTION TRANSMISSION

This application is a 35 USC §371 National Stage entry of International Application No. PCT/KR2012/006255, filed Aug. 7, 2012, and claims priority to U.S. Provisional Application Nos. 61/515,970, filed Aug. 7, 2011 and 61/556,185 filed Nov. 5, 2011, each of which are hereby incorporated by reference in its entirety.

BACKGROUND OF THE INVENTION

The present invention relates to wireless communication and, more particularly, to a method for transmitting and receiving a frame on the basis of frequency selection transmission by a station in a wireless local area network (WLAN) system, and an apparatus supporting the same.

RELATED ART

With the growth of information communication technology, various wireless communication technologies have been recently developed. Among others, Wireless Local Area Network (WLAN) is a technology that allows for wireless access to the Internet at home or business or in a specific service area using a handheld terminal such as a personal digital assistant (PDA), a laptop computer, a portable multimedia player (PMP), etc.

IEEE 802.11n is a technology standard that has been recently established in order to overcome the limit to communication speed that has been recognized as a weakness of WLAN. IEEE 802.11n aims to increase network speed and reliability and expand coverage of a wireless network. More specifically, the IEEE 802.11n system adopts MIMO (Multiple Inputs and Multiple Outputs) technology that uses multiple antennas at both a transmission unit and a reception unit thereof so as to optimize data speed and to minimize transmission errors while supporting a high throughput (HT) of data processing speed up to 540 Mbps.

Meanwhile, as prevalence of wireless local area network (WLAN) has been activated, an environment in which a single AP provides a large number of non-AP stations appears. Characteristics of WLAN supporting such an environment may be represented by a low data rate, low power, and wide coverage. To this end, devices operating in the corresponding WLAN environment may transmit and receive radio signals by using a lower frequency band.

As a lower frequency band is used, a channel bandwidth used for transmission and reception of a radio signal may be narrowed, relative to the case of using an existing high frequency band. Thus, discussions of data transmission and reception related to a channel access method, an interference avoidance method, and the like, in case of using a narrow-band channel may be required.

SUMMARY OF THE INVENTION

An aspect of the present invention provides a method and apparatus for transmitting and receiving frames on the basis of frequency selection transmission in a wireless local area network (WLAN) system.

In an aspect, a method for transmitting a data frame through a channel including a plurality of sub-channels by a transmitter in a wireless local area network (WLAN) system is provided. The method includes acquiring first channel state information regarding each of the plurality of sub-channels from a first receiver, allocating one or more first allocation sub-channels, among the plurality of sub-channels, to the first receiver on the basis of the first channel state information, when the one or more first allocation sub-channels correspond to a portion of the plurality of channels, acquiring second channel state information regarding each of the plurality of sub-channels from a second receiver, allocating one or more second allocation sub-channels, among the plurality of sub-channels, to the second receiver on the basis of the second channel state information, and transmitting a data unit to the first and second receivers. The data unit comprises first and second data frames. The first data frame is transmitted through the one or more first allocation sub-channels. The second data frame is transmitted through the one or more second allocation sub-channels.

The data unit may further include a preamble part, and the preamble part comprises sub-channel allocation indication information indicating sub-channels allocated to the first and second receivers.

The first channel state information may include a signal-to-noise ratio (SNR) estimated between the transmitter and the first receiver with respect to each sub-channel. The second channel state information may include a signal-to-noise ratio (SNR) estimated between the transmitter and the second receiver with respect to each sub-channel.

The step of allocating the one or more first allocation sub-channels to the first receiver may include allocating a particular sub-channel having the highest SNR estimated between the transmitter and the first receiver as the first allocation sub-channel.

The step of allocating the one or more first allocation sub-channels to the first receiver may include allocating one or more sub-channels having SNR estimated between the transmitter and the first receiver higher than a particular threshold value as the first allocation sub-channel.

The step of acquiring the first channel state information may include transmitting a null data packet (NDP) announcement (NDPA) frame indicating transmission of an NDP for channel sounding, transmitting the NDP, and receiving a first feedback frame including the first state channel information acquired on the basis of the NDP from the first receiver.

The step of acquiring the second channel state information comprises transmitting a feedback poll frame indicating reporting of the second channel state information to the second receiver, and receiving a second feedback frame including the second state channel information acquired on the basis of the NDP from the second receiver.

The NPDA frame may include information identifying the first and second receivers as target receives of the channel sounding.

The NDPA frame may be transmitted in a duplicated data unit format simultaneously transmitted through each of the plurality of sub-channels.

The NDP may be transmitted in the duplicated data unit format transmitted through each of the plurality of sub-channels.

The one or more second allocation sub-channels are selected from among sub-channels excluding the one or more first allocation sub-channels among the plurality of sub-channels.

The method may further include transmitting the first data frame to the first receiver through the channels, when all of the plurality of channels are allocated as the one or more first allocation sub-channels, The method may further include receiving a first acknowledgement (ACK) frame through the one or more first allocation sub-channels in response to the first data frame, and receiving a second ACK frame through the one or more first allocation sub-channels in response to second first data frame.

The first ACK frame and the second ACK frame are simultaneously transmitted.

In another aspect, a wireless device operated in a wireless local area network (WLAN) system is provided. The wireless device includes a transceiver configured to transmit and receive a wireless signal through a channel including a plurality of sub-channels, and a processor operably coupled to the transceiver. The processor is configured to acquire first channel state information regarding each of the plurality of sub-channels from a first receiver, allocate one or more first allocation sub-channels, among the plurality of sub-channels, to the first receiver on the basis of the first channel state information, acquire second channel state information regarding each of the plurality of sub-channels from a second receiver, when the one or more first allocation sub-channels correspond to a portion of the plurality of channels, allocate one or more second allocation sub-channels to the second receiver on the basis of the second channel state information, and transmit a data unit to the first and second receivers. The data unit comprises first and second data frames. The first data frame is transmitted through the one or more first allocation sub-channels. The second data frame is transmitted through the one or more second allocation sub-channels.

According to embodiments of the present invention, an access point (AP) may acquire channel state information regarding a sub-channel between an individual STA and the AP through a channel sounding procedure. The AP may determine an appropriate sub-channel to be used for transmitting a data frame to a specific STA on the basis of the channel state information of the sub-channel. The AP may transmit a data frame to one or more STAs according to a DL-FDMA scheme through the sub-channel determined for allocation. The AP may selectively allocate a channel in a good condition to a specific STA, and transmit a data frame to one or more STAs therethrough. Such a data frame transmission method may enhance reliability of data transmission and reception and throughput of an overall WLAN system.

DESCRIPTION OF EXEMPLARY EMBODIMENTS

Figure 1:
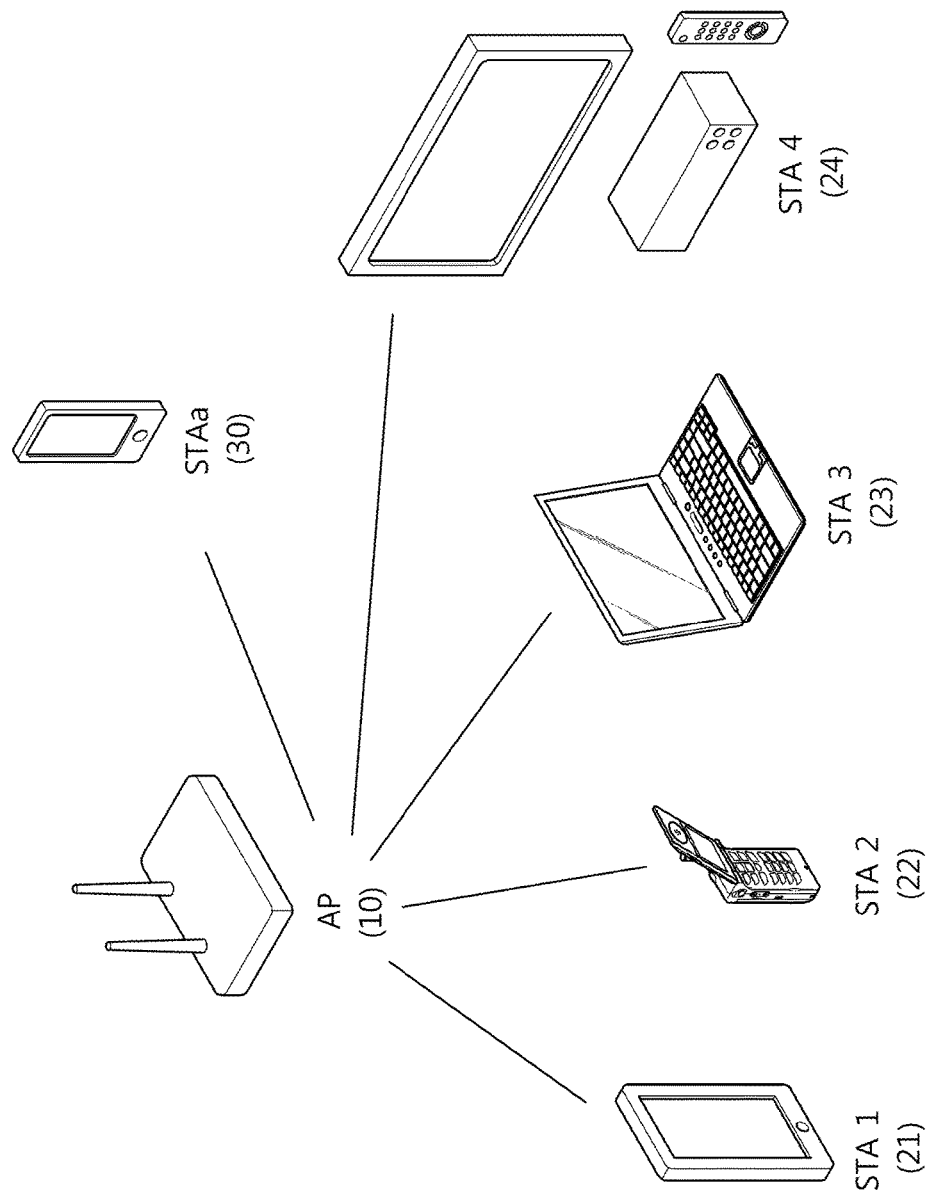
FIG. 1 is a view illustrating the configuration of a general Wireless Local Area Network (WLAN) system to which an embodiment of the present invention may apply.

FIG. 1 is a view illustrating the configuration of a general Wireless Local Area Network (WLAN) system to which an embodiment of the present invention may apply.

Referring to FIG. 1, the WLAN system includes one or more basic service sets (BSSs). A BSS is a set of stations (STAs) that may be successfully synchronized with each other and may communicate with each other, and is not a concept indicating a specific area.

An infrastructure BSS includes one or more non-Access Point (AP) stations (non-AP STA1(21), non-AP STA2(22), non-AP STA3(23), non-AP STA4(24), and non-AP STAa (30)), an AP 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional entity that includes a medium access control (MAC) and a physical layer interface for a radio medium that follow the Institute of Electrical and Electronics Engineers (IEEE) 802.11 standards and in broader concept includes an AP and a non-AP station.

A non-AP STA is a STA that is not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional entity that provides access to a DS via a radio medium for a STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the WLAN system according to IEEE 802.11, the basic access mechanism of Medium Access Control (MAC) is a Carrier Sense Multiple Access with Collision Avoidance (CSMA/CS) mechanism. The CSMA/CS mechanism is also referred to as Distributed Coordination Function (DCF) of IEEE 802.11 MAC, and basically, it adopts a "listen before talk" access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the WLAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers a Hybrid Coordination Function (HCF) that is based on a Point Coordination Function (PCF) that periodically performs polling so that all receiving APs and/or STAs may receive data packets in polling-based synchronized access scheme with the DCF. The HCF has an Enhanced Distributed Channel Access (EDCA) that has a contention-based access scheme for providing data packets to multiple users and HCCA (HCF Controlled Channel Access) that uses contention free-based channel access scheme using a polling mechanism. The HCF includes a medium access mechanism for enhancing Quality of Service (QoS) of WLAN and may transmit QoS data in both a contention period (CP) and contention free period (CFP).

In the wireless communication system, a STA cannot be immediately aware of the existence of a network due to the characteristics of the radio medium when a STA powers on and starts operating. Accordingly, in order to access a network, a STA, whatever type it is, should go through a network discovery process. When discovering a network through the network discovery process, the STA selects a network to subscribe to through a network selection process. Thereafter, the STA subscribes to the selected network and performs data exchange at a transmission end/reception end.

In the WLAN system, the network discovery process is implemented as a scanning procedure. The scanning procedure is separated into passive scanning and active scanning. The passive scanning is achieved based on a beacon frame that is periodically broadcast by an AP. In general, an AP in the WLAN system broadcasts a beacon frame at a specific interval (for example, 100 msec). The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. When receiving the probe request frame, an AP waits for a random time so as to prevent frame collision, and then includes network information in a probe response frame, then transmits the probe response frame to the STA. The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in WLAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As WLAN spreads and more diversified applications using WLAN show up, a need for a new WLAN system arises for supporting a higher throughput than the data processing speed supported by IEEE 802.11n. The WLAN system supporting very high throughput (VHT) is a subsequent version of the IEEE 802.11n WLAN system, which is a new one recently suggested to support a throughput more than 500 Mbps for a single user and data processing speed more than 1 Gpbs for multiple users in an MAC service access point (SAP).

Advancing further than the existing WLAN system supporting 20 MHz or 40 MHz, the VHT WLAN system intends to support 80 MHz, contiguous 160 MHz, non-contiguous 160 MHz band transmission and/or more bandwidth transmission. Further, the VHT WLAN system supports 250 Quadrature Amplitude Modulation (QAM) that is more than a maximum of 64QAM of the existing WLAN system.

Since the VHT WLAN system supports a Multi User-Multiple Input Multiple Output (MU-MIMO) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the WLAN system shown in the figure, the AP 10 may simultaneously transmit data to a STA group including at least one or more STAs among a plurality of STAs 21, 22, 23, 24, and 30 associated with the AP 10. In FIG. 1, by way of example, the AP conducts MU-MIMO transmission to the STAs. However, in a WLAN system supporting Tunneled Direct Link Setup (TDLS) or Direct Link Setup (DLS) or mesh network, a STA to transmit data may send a Physical Layer Convergence Procedure (PLCP) Protocol Data Unit (PPDU) to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the WLAN system and transmitted, or a frame as a data field included in the PPDU. That is, the PPDU for Single User-Multiple Input Multiple Output (SU-MIMO) and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

Table 1 below represents information elements included in the group ID management frame.

TABLE 1

| Order | Information |
| --- | --- |
| 1 | Category |
| 2 | VHT action |
| 3 | Membership status |
| 4 | Spatial stream position |

The category field and VHT action field are configured so that the frame corresponds to a management frame and to be able to identify being a group ID management frame used in a next-generation WLAN system supporting MU-MIMO.

As in Table 1, the group definition information includes membership status information indicating whether to belong to a specific group ID, and in case of belonging to the group ID, information indicating the number of position to which the spatial stream set of the STA corresponds in all the spatial streams according to MU-MIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, a STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Meanwhile, TV WS (White Space) draws attention as a newly available frequency band in the WLAN system. TV WS refers to an unused frequency band that is left as the analog TV broadcast is digitalized in the U.S. For example, TV WS includes a 54 to 598 MHz band. However, this is merely an example, and TV WS may be a permitted band that may be first used by a licensed user. The licensed user means a user that is permitted for use of a permitted band, and may also be referred to as a licensed device, primary user, or incumbent user.

The AP and/or STA operating in the TV WS should offer a protection function as to a licensed user, and this is because a licensed user has priority as to use of a TV WS band. For instance, in case a licensed user such as a microphone is already using a specific WS channel that is a frequency band split per protocol to have a certain bandwidth in the TV WS band, the AP and/or STA cannot use the frequency band corresponding to the WS channel in order to protect the licensed user. Further, the AP and/or STA should stop use of the frequency band if the licensed user happens to use the frequency band that is being used for transmission and/or reception of a current frame.

Accordingly, the AP and/or STA should first grasp whether a specific frequency band in the TV WS band is available, in other words, whether there is a licensed user in the frequency band. Grasping whether there is a licensed user in the specific frequency band is denoted spectrum sensing. As a spectrum sensing mechanism, an energy detection scheme or signature detection scheme may be utilized. If the strength of a received signal is higher than a predetermined value, it is determined that it is being used by a licensed user, or if a DTV preamble is detected, it may be determined to be being used by a licensed user.

Figure 2:
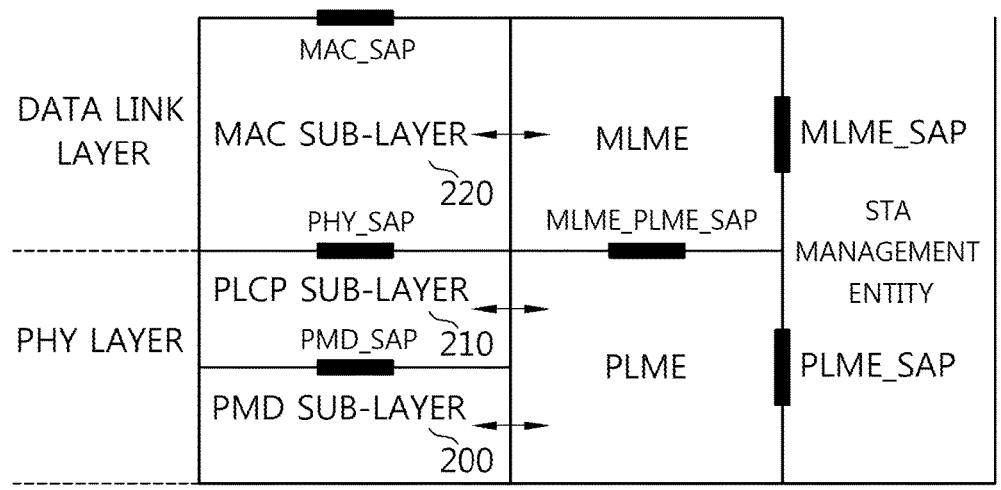
FIG. 2 is a view illustrating a physical layer architecture of a WLAN system supported by IEEE 802.11.

FIG. 2 is a view illustrating a physical layer architecture of a WLAN system supported by IEEE 802.11.

The IEEE 802.11 physical (PHY) architecture includes a PHY Layer Management Entity (PLME), a Physical Layer Convergence Procedure (PLCP) sublayer 210, and a Physical Medium Dependent (PMD) sublayer 200. The PLME provides a function of managing the physical layer in cooperation with the MAC Layer Management Entity (MLME). The PLCP sublayer 210 delivers an MAC Protocol Data Unit (MPDU) received from the MAC sublayer 220 to the PMD sublayer in response to an instruction of the MAC layer between the MAC sublayer 220 and the PMD sublayer 200 or delivers a frame coming from the PMD sublayer 200 to the MAC sublayer 220. The PMD sublayer 200 is a PLCP lower layer and enables transmission and reception of a physical layer entity between two stations through a radio medium. The MPDU delivered by the MAC sublayer 220 is denoted a Physical Service Data Unit (PSDU) in the PLCP sublayer 210. The MPDU is similar to the PSDU, but in case an aggregated MPDU (A-MPDU)

obtained by aggregating a plurality of MPDUs is delivered, each MPDU may be different from each PSDU.

The PLCP sublayer 210 adds an additional field including information needed by a physical layer transceiver while delivering a PSDU from the MAC sublayer 220 to the PMD sublayer 200. At the time, the added field may include a PLCP preamble to the PSDU, a PLCP header, or tail bits necessary for turning a convolution encoder back into the zero state. The PLCP sublayer 210 receives from the MAC sublayer a TXVECTOR parameter including control information necessary to generate and transmit a PPDU and control information necessary for the STA to receive and analyze a PPDU. The PLCP sublayer 210 uses information included in the TXVECTOR parameter in generating a PPDU including the PSDU.

The PLCP preamble plays a role to let the receiver prepare for a synchronization function and antenna diversity before the PSDU is transmitted. The data field may include a coded sequence where the PSDU, padding bits attached to the PSDU, a service field including a bit sequence for initializing a scrambler, and the tail bits are encoded. At the time, as an encoding scheme, depending on the encoding scheme supported by the STA receiving the PPDU, Binary Convolution Coding (BCC) encoding or Low Density Parity Check (LDPC) encoding may be selected. The PLCP header includes a field including information on the PPDU to be transmitted, and this will be described in further detail below with reference to FIGS. 3 and 4.

Figure 3:
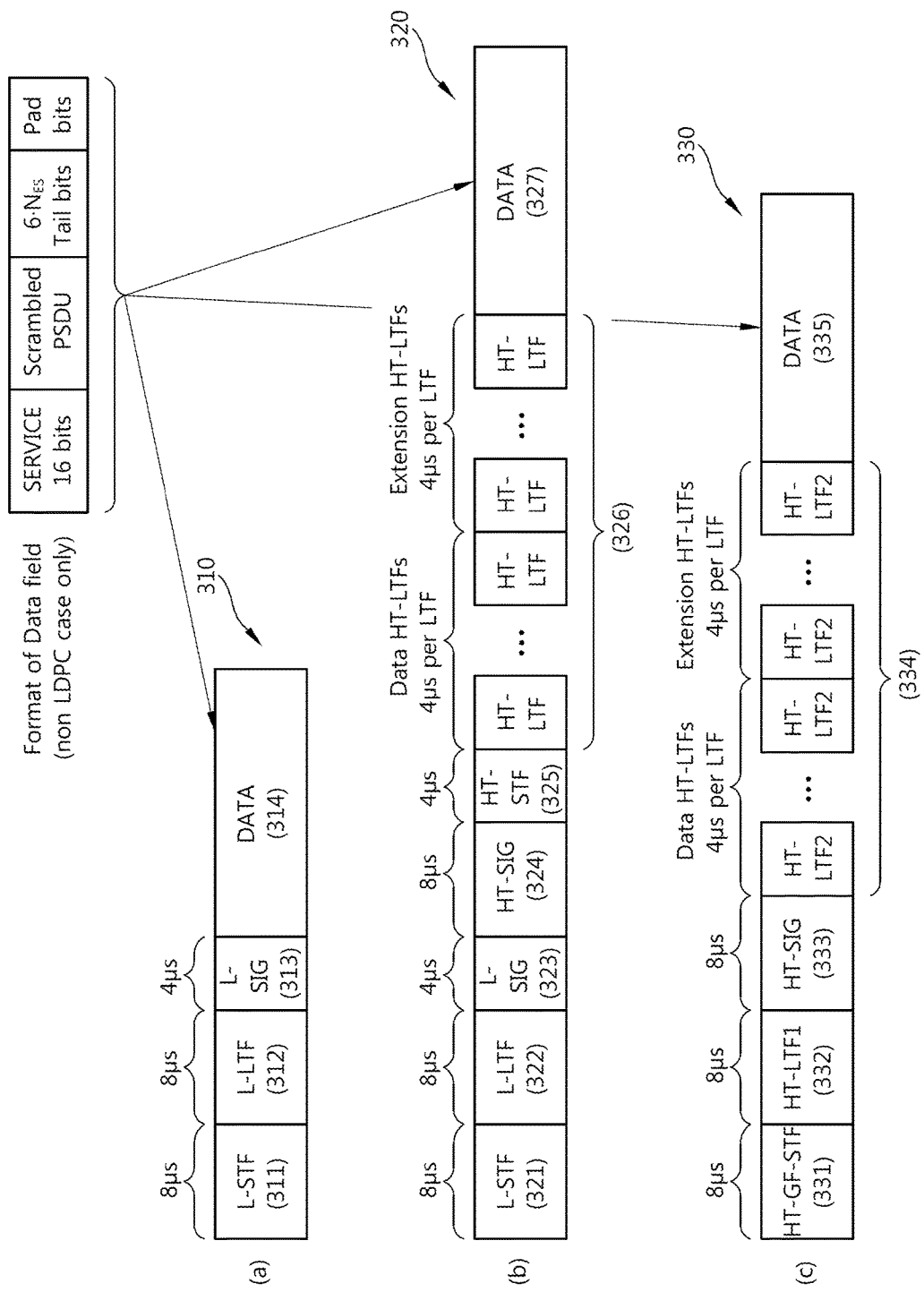
FIGS. 3 and 4 are block diagrams illustrating the format of a PPDU used in a WLAN system to which an embodiment of the present invention may apply.
Figure 4:
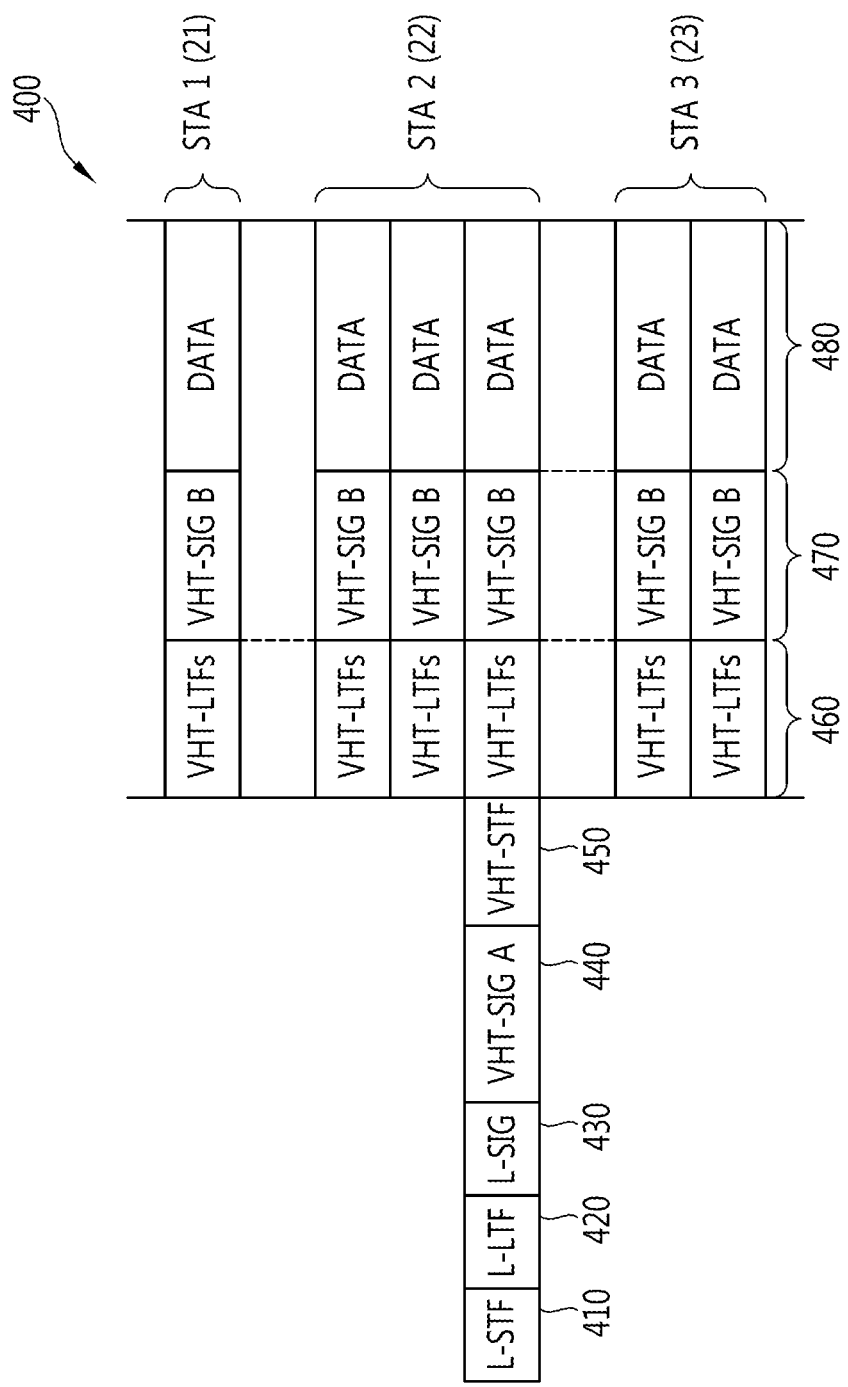

The PLCP sublayer 210 adds the above-described fields to the PSDU to thereby generate a PPDU and transmits the PPDU to a receiving station via the PMD sublayer, and the receiving STA receives the PPDU and obtains the information necessary for restoring data from the PLCP preamble and PLCP header and restores data. The PLCP sublayer of the receiving station delivers to the MAC sublayer the RXVECTOR parameter including the control information contained in the PLCP header and the PLCP preamble and may analyze the PPDU and obtain data in the receiving state FIGS. 3 and 4 are block diagrams illustrating the format of a PPDU used in a WLAN system to which an embodiment of the present invention may apply. Hereinafter, the STA operating in a legacy WLAN system based on IEEE 802.11a/b/g, existing WLAN Standards prior to IEEE 802.11n is referred to a legacy STA (L-STA). Further, the STA that may support HT in an HT WLAN system based on IEEE 802.11n is referred to as an HT-STA.

A sub-figure (a) of FIG. 3 illustrates the format of a legacy PPDU (L-PPDU) used in IEEE 802.11a/b/g that are existing WLAN system standards before IEEE 802.11n. Accordingly, in the HT WLAN system to which the IEEE 802.11n standard applies, the legacy-STA (L-STA) may transmit and receive an L-PPDU having the same format.

Referring to the sub-figure (a), the L-PPDU 310 includes an L-STF 311, an L-LTF 312, an L-SIG field 313, and a data field 314.

The L-STF 311 is used for frame timing acquisition, Automatic Gain Control (AGC) convergence, and coarse frequency acquisition.

The L-LTF 312 is used for frequency offset and channel estimation.

The L-SIG field 313 includes control information for demodulating and decoding the data field 314.

A sub-figure (b) of FIG. 3 is a block diagram illustrating an HT-mixed PPDU format that enables an L-STA and an HT-STA to co-exist. Referring to the sub-figure (b), the HT-mixed PPDU 320 includes an L-STF 321, an L-LTF 322, an L-SIG 3field 23, an HT-SIG field 324, an HT-STF 325, and a plurality of HT-LTFs 326, and a data field 327.

The L-STF 321, L-LTF 322, and L-SIG field 323 are the same as those denoted by reference numerals 311, 312, and 313, respectively, of the sub-figure (a). Accordingly, the L-STA, even when receiving the HT-mixed PPDU 320, may analyze the data field through the L-STF 321, L-LTF 322, and L-SIG 323. However, the L-LTF 322 may further include information for channel estimation that is to be conducted for the HT-STA to receive the HT-mixed PPDU 320 and to decipher the L-SIG 323, HT-SIG 324, and HT-STF 325.

The HT-STA may be aware that the HT-mixed PPDU 320 is a PPDU for itself through the HT-SIG 324 coming after the L-SIG 323, and based on this, may demodulate and decode the data field 327.

The HT-STF 325 may be used for frame timing synchronization or AGC convergence for an HT-STA.

The HT-LTF 326 may be used for channel estimation to demodulate the data field 327. Since IEEE 802.11n supports SU-MIMO, there may be a plurality of HT-LTFs 326 for each data field transmitted in a plurality of spatial streams.

The HT-LTF 326 may consist of a data HT-LTF used for channel estimation for a spatial stream and an extension HT-LTF additionally used for full channel sounding. Accordingly, the number of the plurality of HT-LTFs 326 may be equal to or more than the number of spatial streams transmitted.

In the HT-mixed PPDU 320, the L-STF 321, L-LTF 322, and the L-SIG field 323 are first transmitted so that the L-STA may also receive it to thereby obtain data. Thereafter, the HT-SIG field 324 is transmitted for demodulating and decoding data transmitted for the HT-STA.

The HT-SIG field 324 and its precedents are transmitted without beamforming, so that the L-STA and the HT-STA may receive the PPDU to thereby obtain data, and the HT-STF 325, HT-LTF 326 and the data field 327 transmitted thereafter are subjected to radio signal transmission through precoding. Here, the HT-STF 325 is transmitted and then the plurality of HT-LTFs 326 and the data field 327 are transmitted so that a power variation by precoding may be taken into account by the STA conducting reception through precoding.

Although in the HT WLAN system, the HT-STA using 20 MHz uses 52 data subcarriers per OFDM symbol, the L-STA using the same frequency, 20 MHz, still makes use of 48 subcarriers per OFDM symbol. In order for backward compatibility with the existing systems, the HT-SIG field 324 in the HT-mixed PPDU 320 is decoded using the L-LTF 322, so that the HT-SIG field 324 is constituted of 48×2 data subcarriers. Thereafter, the HT-STF 325 and the HT-LTF 326 consists of 52 data subcarriers per OFDM symbol. As a result, the HT-SIG field 324 is supported with ½, BPSK (Binary Phase Shift Keying), each HT-SIG field 324 consists of 24 bits, and is thus transmitted with a total of 48 bits. In other words, channel estimation for the L-SIG field 323 and the HT-SIG field 324 utilizes the L-LTF 322, and the bit stream constituting the L-LTF 322 is represented as in Equation 1 below. The L-LTF 322 consists of 48 data subcarriers except a DC subcarrier per symbol.

$$L_{-26,26}=\{1,1,-1,-1,1,1,-1,1,-1,1,1,1,1,1,1,-1,-1,\\ 1,1,-1,1,-1,1,1,1,1,0,1,-1,-1,1,1,-1,1,-1,\\ 1,-1,-1,-1,-1,-1,1,1,-1,-1,1,-1,1,-1,1,1,1,1,1\} \quad \text{[Equation 1]}$$

A sub-figure (c) of FIG. 3 is a block diagram illustrating an HT-greenfield PPDU 330 format that may be used only by an HT-STA. Referring to the sub-figure (c), the HT-GF PPDU 330 includes an HT-GF-STF 331, an HT-LTF1 332, an HT-SIG 333, a plurality of HT-LTF2s 334, and a data field 335.

The HT-GF-STF 331 is used for frame timing acquisition and AGC.

The HT-LTF1 332 is used for channel estimation.

The HT-SIG 333 is used for demodulating and decoding the data field 335.

The HT-LTF2 334 is used for channel estimation for demodulating the data field 335. Likewise, the HT-STA uses SU-MIMO and thus requires channel estimation for each data field transmitted I a plurality of spatial streams. Accordingly, a plurality of HT-LTFs 326 may be configured.

The plurality of HT-LTF2s 334 may consist of a plurality of extension HT-LTFs and a plurality of data HT-LTFs like the HT-LTFs 326 of the HT-mixed PPDU 320.

The data fields 314, 327, and 335, respectively shown in sub-figures (a), (b), and (c) of FIG. 3, each, may include a service field, a scrambled PSDU, a tail bit and a padding bit. The service field may be used for initializing a scrambler. The service field may be configured as 16 bits. In such case, seven bits may be configured for initializing a scrambler. The tail field may be configured as a bit sequence necessary for turning a convolution encoder back into a zero state. The tail field may be assigned a bit size that is proportional with the number of BCC encoders used for encoding data to be transmitted. More specifically, it may be configured to have six bits per BCC count.

FIG. 4 is a view illustrating an example of a PPDU format used in a WLAN system supporting VHT.

Referring to FIG. 4, the PPDU 400 may include an L-STF 410, an L-LTF 420, an L-SIG field 430, a VHT-SIGA field 440, a VHT-STF 450, a VHT-LTF 460, a VHT-SIGB field 470, and a data field 480.

The PLCP sublayer configuring the PHY adds necessary information to the PSDU delivered from the MAC layer to generate the data field 480, adds to it the L-STF 410, the L-LTF 420, the L-SIG field 430, the VHT-SIGA field 440, the VHT-STF 450, the VHT-LTF 460, and the VHT-SIGB field 470 or other fields to thereby generate the PPDU 400, and transmits it to one or more STAs through the PMD sublayer constituting the PHY. The control information necessary for the PLCP sublayer to generate the PPDU and the control information that is included in the PPDU and transmitted to be used for the receiving STA to interpret the PPDU are provided from the TXVECTOR parameter delivered from the MAC layer.

The L-STF 410 is used for frame timing acquisition, AGC convergence, and coarse frequency acquisition.

The L-LTF 420 is used for channel estimation to demodulate the L-SIG field 430 and the VHT-SIGA field 440.

The L-SIG field 430 is used for the L-STA to receive the PPDU 400 and interpret the PPDU 400 to thereby obtain data. The L-SIG field 430 includes a rate subfield, a length subfield, a parity bit and a tail field. The rate subfield is set with a value indicating a bit rate for data to be currently transmitted.

The length subfield is set as a value indicating the octet length of the PSDU by which the MAC layer sends a request for transmission to the PHY layer. At the time, a parameter related to the information on the octet length of the PSDU, L-LENGTH parameter, is determined based on a transmission time-related parameter, TXTIME parameter. TXTIME indicates a transmission time determined for transmission of the PPDU including the PSDU by the PHY layer, corresponding to the transmission time requested by the MAC layer for transmission of the PSDU. Accordingly, the L-LENGTH parameter is a time-related parameter, and thus, the length subfield included in the L-SIG field 430 ends up containing transmission time-related information.

The VHT-SIGA field 440 includes control information (or signal information) necessary for the STAs receiving the PPDU to interpret the PPDU 400. The VHT-SIGA field 440 is transmitted in two OFDM symbols. Accordingly, the VHT-SIGA field 440 may be split into a VHT-SIGA1 field and a VHT-SIGA2 field. The VHT-SIGA1 field includes information on the channel bandwidth used for PPDU transmission, identification information related to whether Space Time Block Coding (STBC) is to be used, information indicating one of the SU or MU-MIMO scheme in which the PPDU is transmitted, information indicating a transmission target STA group including a plurality of STAs MU-MIMO paired with the AP in case the transmission scheme is MU-MIMO, and information on a spatial stream assigned to each STA included in the transmission target STA group. The VHT-SIGA2 field includes short guard interval (GI)-related information.

The information indicating the MIMO transmission scheme and the information indicating the transmission target STA group may be implemented as one piece of MIMO indication information, and as an example, may be embodied as a group ID. The group ID may be set as a value having a specific range, and in the range, a predetermined value indicates the SU-MIMO transmission scheme, and the other values may be used as an identifier for the transmission target STA group in case the PPDU 400 is transmitted in the MU-MIMO transmission scheme.

If the group ID indicates that the PPDU 400 is transmitted through the SU-MIMO transmission scheme, the VHT-SIGA2 field includes coding indication information indicating whether the coding scheme applied to the data field is BCC or LDPC coding and Modulation Coding Scheme (MCS) information on a channel between transmitter and receiver. Further, the VHT-SIGA2 field may include an AID of the transmission target STA or a partial AID including some bit sequences of the AID.

If the group ID indicates that the PPDU 400 is transmitted through the MU-MIMO transmission scheme, the VHT-SIGA field 440 includes coding indicating information indicating whether the coding schemes applied to the data fields intended to be sent to the receiving STAs MU-MIMO paired are BCC or LDPC coding. In such case, the MCS information on each receiving STA may be included in the VHT-SIGB field 470.

The VHT-STF 450 is used for enhancing the ACG estimation capabilities in MIMO transmission.

The VHT-LTF 460 is used for a STA to estimate an MIMO channel. Since the next-generation WLAN system supports MU-MIMO, as many VHT-LTFs 460 as the number of spatial streams where the PPDU 400 is transmitted may be configured. Additionally, full channel sounding is supported, and in case this is conducted, the number of VHT LTFs may increase.

The VHT-SIGB field 470 includes dedicated control information necessary for a plurality of MIMO paired STAs to receive the PPDU 400 to obtain data. Accordingly, only when the control information included in the PPDU 400 indicates that the currently received PPDU 400 is MU-MIMO transmitted, the STA may be designed to decode the VHT-SIGB field 470. On the contrary, in case the control information included in the VHT-SIGA field 440 indicates that the currently received PPDU 400 is one for a single STA (including SU-MIMO), the STA may be designed not to decode the VHT-SIGB field 470.

The VHT-SIGB field 470 may contain information on the MCS for each STA and information on rate matching. Further, it may contain information indicating the PSDU length included in the data field for each STA. The information indicating the length of the PSDU is information indicating the length of the bit sequence of the PSDU and may perform such information on a per-octet basis. Meanwhile, in case the PPDU is SU-transmitted, the information on the MCS is included in the VHT-SIGA field 440, so that it might not be included in the VHT-SIGB field 470. The size of the VHT-SIGB field 470 may vary depending on the type of the MIMO transmission (MU-MIMO or SU-MIMO) and channel bandwidth used for transmission of the PPDU.

The data field 480 includes data which intends to be sent to the STA. The data field 480 includes a service field for initializing a scrambler and PSDU where an MPDU is delivered in the MAC layer, a tail field including a bit sequence necessary to turn the convolution encoder back into zero state, and padding bits for normalizing the length of the data field. In the case of MU transmission, the data field 480 transmitted to each STA may include a data unit whose transmission is intended, and the data unit may be an A-MPDU.

In the WLAN system as shown in FIG. 1, in case the AP 10 attempts to send data to STA1 21, STA2 22, and STA3 23, a PPDU may be transmitted to the STA group including STA1 21, STA2 22, STA3 223, and STA4 24. In such case, as shown in FIG. 4, no spatial stream may be assigned to STA4 24, and a specific number of spatial streams are assigned to each of the STA1 21, STA2 22, and STA3 23, and data may be transmitted accordingly. In the example as illustrated in FIG. 4, one spatial stream may be assigned to STA1 21, three to STA2 22, and two to STA3 23.

A WLAN system supporting a MIMO transmission scheme using multiple antennas have characteristics in that throughput of the system may be enhanced by transmitting several spatial streams. In a state in which a plurality of STAs exist, beamforming to a specific STA to which data is to be transmitted is required, whereby channel state information may be fed back through channel sounding.

In the WLAN system, two types of channel sounding methods are provided. One is a method on the basis of a PPDU including a data field, and the other is a method on the basis of a Null Data Packet (NDP) having a PPDU format not including a data field. In case of performing channel sounding on the basis of an NDP, a PPDU indicating that an NDP will be transmitted should be first transmitted. This may be implemented by including signaling information indicating that NDP will be transmitted in an HT control field of a PPDU and transmitting the same or by transmitting a separately defined Null Data Packet Announcement (NPDA) frame.

Figure 5:
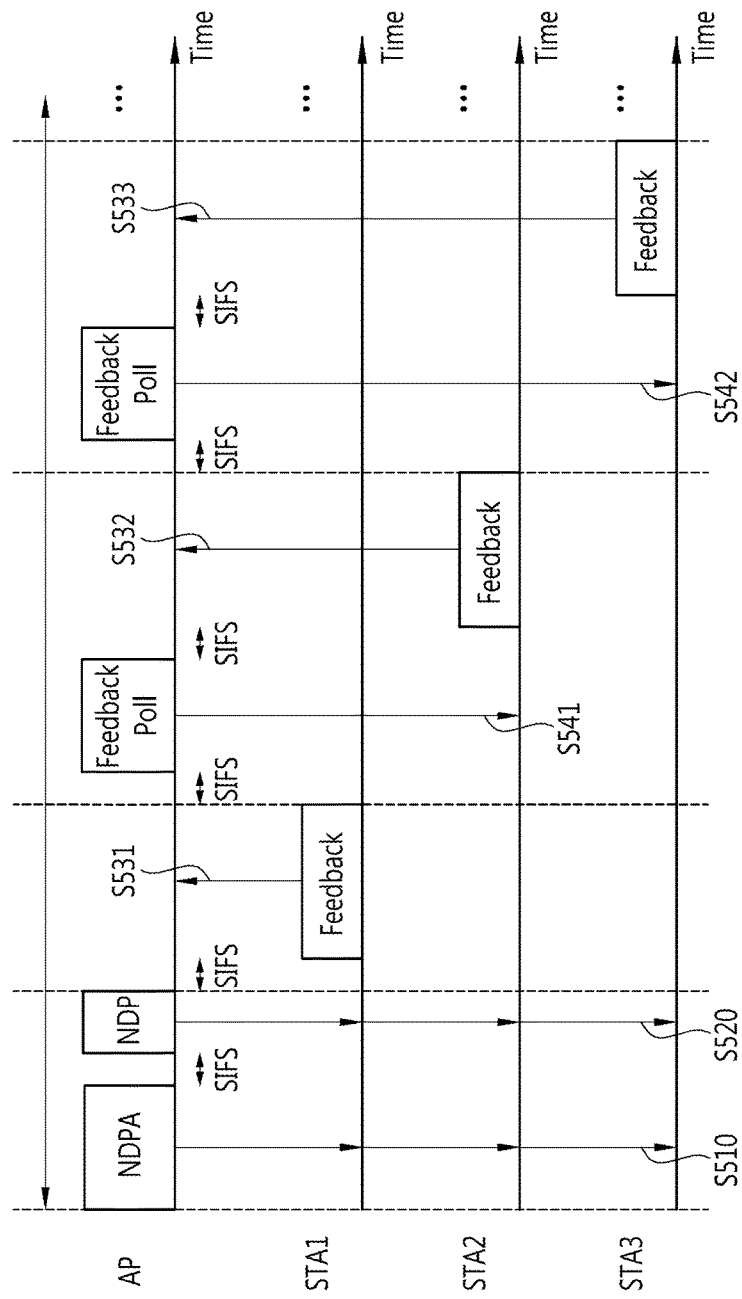
FIG. 5 is a view illustrating a channel sounding method using an NDP in a next-generation WLAN system.

FIG. 5 is a view illustrating a channel sounding method using an NDP in a next-generation WLAN system. In this example, in order to transmit data to three transmission target STAs, an AP performs channel sounding on the three transmission target STAs. In this case, however, the AP may perform channel sounding only on a single STA.

Referring to FIG. 5, the AP transmits an NDPA frame to STA1, STA2, and STA3 (S501). The NDPA frame informs that channel sounding will be initiated and an NDP will be transmitted. The NDPA frame may also be called a sounding announcement frame.

The NDPA frame includes information for identifying an STA that estimates a channel and transmits a feedback frame including channel state information to the AP. Namely, each STA determines whether to join channel sounding upon receiving the NDPA frame. Thus, the AP may include an STA information field including information regarding a sounding target STA in the NDPA frame and transmit the same. The STA information field may be included in every sounding target STA.

It is to provide information for identifying an STA which is to transmit a feedback frame in response to a subsequently transmitted NDP. In case of transmitting the NDPA frame to one or more target STAs for MU-MIMO channel sounding, the AP broadcasts the NDPA frame. Meanwhile, in case of transmitting the NDPA frame to a single target STA for SU-MIMO channel sounding, the AP may set recipient address information of the NDPA frame as a MAC address of a corresponding target STA, and transmits the NDPA frame in a unicast manner.

Table 2 below shows an example of an STA information field format included in the NDPA frame.

TABLE 2

| Subfield | Description |
| --- | --- |
| AID | It includes an association ID (AID) of a sounding target station |
| Feedback type | It indicates a feedback request type with respect to sounding target station<br>It is '0' in case of SU-MIMO<br>It is '1' in case of MU-MIMO |
| Nc index | It indicates requested feedback dimension<br>In case of MU-MIMO:<br>It is set to '0' when Nc = 1<br>It is set to '1' when Nc = 2<br>It is set to '2' when Nc = 3<br>It is set to '3' when Nc = 4<br>It is set to '4' when Nc = 5<br>It is set to '5' when Nc = 6<br>It is set to '6' when Nc = 7<br>It is set to '7' when Nc = 8<br>In case of SU-MIMO,<br>it is set to reserved sub-field (set to 0) |

In Table 1, Nc indicates the number of columns of a beamforming feedback matrices included in feedback information which a sounding target STA having received an NDP transmits to the AP in response to the NDP.

Upon receiving the NDPA frame, each STA may check an AID subfield value included in the STA information field, and recognize whether each STA is a sounding target STA. In the embodiment as illustrated in FIG. 5, the NDPA frame may include an STA information field including an AID of the STA1, an STA information field including an AID of the STA2, and an STA information field including an AID of the STA3.

Following the NDPA frame transmission, the AP transmits an NDP to target STAs (S520). The NDP may have a format such that a data field is omitted in the PPDU format as shown in FIG. 4. The NDP frame is precoded on the basis of a specific precoding matrix by the AP, and transmitted to the sounding target STAs. Thus, the sounding target STAs may estimate a channel on the basis of VHT-LTF of the NDP and acquires channel state information.

In transmitting the NDP, as control information included in the NDP, length information indicating a length of a PSDU included in a data field or a length of an A-MPDU included in the PSDU may be set to 0 and information indicating the number transmission target STAs of the NDP is set to 1. A group ID, which indicates whether a transmission technique used for NDP transmission is MU-MIMO or SU-MIMO and indicates a transmission target STA group, is set to a value indicating SU-MIMO transmission. Information indicating the number of spatial streams allocated to a transmission target STA is set to indicate the number of spatial streams transmitted to a transmission target STA through MU-MIMO or SU-MIMO. Channel bandwidth information used for NDP transmission may be set to a bandwidth value used for NDPA frame transmission.

The STA1 transmits a feedback frame to the AP (S531). Channel bandwidth information used for feedback frame transmission may be set to be narrower than or equal to a channel bandwidth used for the NDPA frame transmission.

Upon receiving the feedback frame from the STA1, the AP transmits a feedback poll frame to the STA2 (S541). The feedback poll frame is a frame for requesting a feedback frame transmission from the reception STA. The feedback poll frame is transmitted to an STA from which transmission of a feedback frame is requested, in a unicast manner. Upon receiving the feedback poll frame, the STA2 transmits a feedback frame (S532). Subsequently, the AP transmits a feedback poll frame to the STA3 (S5420, and the STA3 transmits a feedback frame to the AP, in response to the feedback poll frame (S533).

Channel bandwidths for transmitting data may vary in a WLAN system. In order to estimate a channel with respect to various bandwidths, channel information regarding various bandwidths may be fed back. A VHT WLAN system supports 20 MHz, 40 MHz, 80 MHz, a contiguous 160 Mhz, and a noncontiguous 160(80+80) MHz (noncontiguous 160 MHz). Thus, since channel information regarding each bandwidth is fed back, channel feedback information may be increased.

In the present invention, channel state information according to channel estimation performed by a STA is included in a feedback frame, which by transmitted by an STA to an AP, and transmitted. The channel state information of a feedback frame may be implemented by a channel information field and a channel information control field. Table 3 and Table 4 show formats of a channel information control field and a channel information field.

TABLE 3

| Subfield | Description |
| --- | --- |
| Nc index | It indicates number of columns of beamforming feedback matrix<br>It is '0' when Nc = 1<br>It is '1' when Nc = 2<br>...<br>It is '7' when Nc = 8 |
| Nr index | It indicates number of rows of beamforming feedback matrix<br>It is '0' when Nc = 1<br>It is '1' when Nc = 2<br>...<br>It is '7' when Nc = 8 |
| Channel bandwidth | It indicates a bandwidth of estimated channel<br>It is 0 in case of 20 MHz<br>It is 1 in case of 40 MHz<br>It is 2 in case of 80 MHz<br>It is 3 in case of 160 MHz or 80 + 80 MHz |
| Grouping (Ng) | It is the number of carriers for grouping<br>It is 0 when Ng = 1<br>It is 1 when Ng = 2<br>It is 2 when Ng = 4<br>(3 is set as reserve) |
| Codebook information | It indicates a size of codebook entries |
| MU-scheme | It indicates whether feedback is beamforming feedback with respect to SU-MIMO or beamforming feedback with respect to MU-MIMO |
| Sounding sequence | It is a sequence number from NDPA requesting feedback |

TABLE 4

| Subfield | Description |
| --- | --- |
| SNR(signal to noise ratio) of spatial stream 1 | An average SNR on subcarriers in recipient with respect to first spatial stream |
| ... | ... |
| SNR of spatial stream Nc | An average SNR on subcarriers in recipient with respect to Nc spatial stream |
| Beamforming feedback matrix (subcarrier index 0) | Order of angle of beamforming feedback matrix with respect to corresponding subcarrier |
| Beamforming feedback matrix (subcarrier index 1) | Order of angle of beamforming feedback matrix with respect to corresponding subcarrier |
| ... | ... |
| Beamforming feedback matrix (subcarrier index Ns) | Order of angle of beamforming feedback matrix with respect to corresponding subcarrier |

Information described in Table 4 may be translated on the basis of information included in the channel control field described in Table 3.

Meanwhile, recently, as various communication services such as a smart grid, e-Health, ubiquitous, and the like, have been introduced, a machine-to-machine (M2M) technique supporting those services has been spotlighted. Sensors sensing temperature, humidity, and the like, home appliances of a camera, a TV, and the like, process machines in plants, large machines such as vehicles may be an element constituting an M2M system. The elements constituting an M2M system ay transmit and receive data on the basis of WLAN communication. Hereinafter, establishing a network by devices constituting an M2M system, while supporting WLAN, will be referred to as an M2M WLAN system.

Characteristics of a WLAN system supporting M2M are as follows.

1) Large number of stations: Unlike an existing network, M2M is on the basis of an assumption that a large number of STAs exist within a BSS. This is because, sensors, or the like, installed in houses, companies, and the like, are all considered. Thus, a considerably large number of STAs may be connected to a single AP.

2) Low traffic load per STA: Since an STA has a traffic pattern of collecting and reporting surrounding information, information is not required to be frequently sent and an amount of information is small.

3) Uplink-centered communication: M2M has a structure in which a command is mainly received by downlink, an action is taken, and result data is reported to uplink. Primary data is generally transmitted in uplink, so in a system supporting M2M, uplink is the core.

4) Power management of STA: An M2M terminal largely operates with a battery, so it is difficult for a user to frequently charge it in many cases. Thus, a power management method for minimizing battery consumption is required.

5) Automatic recovery function: it is difficult for a user to directly manipulate a device constituting an M2M system in a particular situation, so the device is required to have a self-recovery function.

A WLAN standard considering M2M communication having such characteristics as a use case is under discussion. Distinctive features of an M2M WLAN system lie in that it has significantly large coverage (e.g., up to 1 km) in comparison to an existing indoor-based WLAN in an unlicensed band of sub-1 GHz, excluding a TV white space (WS) band. Namely, unlike the existing WLAN system using 2.4 GHz or 5 GHz, when a WLAN system is operated in a sub-1 GHz band represented by 700 MHz to 900 MHz, coverage of an AP over the same transmission power is extended approximately 2 to 3 times due to propagation characteristics of the corresponding band. In this case, a very large number of STAs may be connected per AP. Use cases considered in the M2M WLAN system are as follows.

Use Case 1: Sensors and meters
1a: Smart Grid—Meter to Pole
1c: Environmental/Agricultural Monitoring
1d: Industrial process sensors
1e: Healthcare
1f: Healthcare
1g: Home/Building Automation
1h: Home sensors
Use Case 2: Backhaul Sensor and meter data
Backhaul aggregation of sensors
Backhaul aggregation of industrial sensors
Use Case 3: Extended range Wi-Fi
Outdoor extended range hotspot
Outdoor Wi-Fi for cellular traffic offloading The sensors and meters in Use Case 1 may correspond to a use case regarding M2M-supported WLAN communication as mentioned above. According to this case, various types of sensor device may be connected to a WLAN AP to perform M2M communication. In particular, in case of a smart grid, a maximum of 6000 sensor devices may be connected to a single AP.

In the backhaul sensor and meter data in Use Case 2 is a use case in which an AP providing large coverage serves as a backhaul link of a different system such as IEEEE 802.15.4 g.

Figure 6:
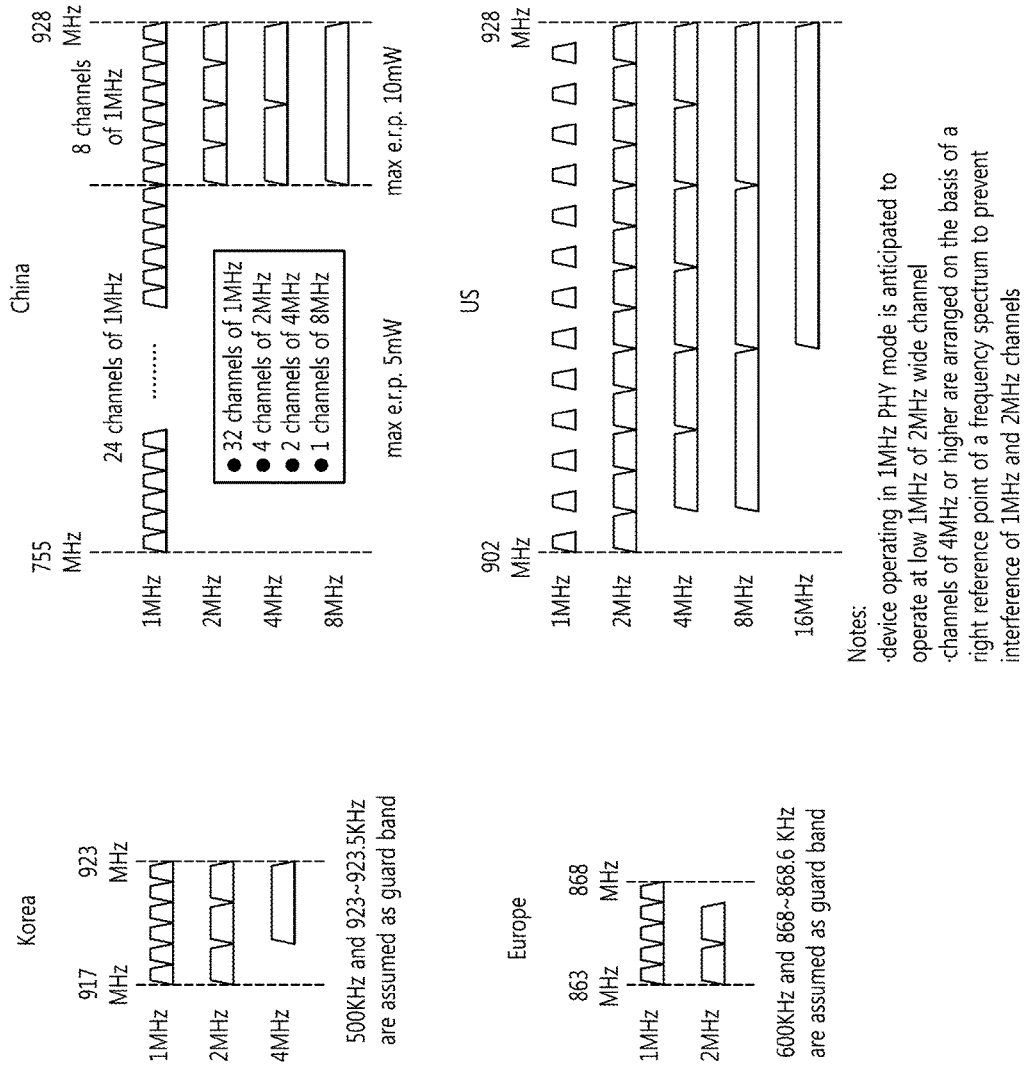
FIG. 6 is a view illustrating an example of channelization of an M2M WLAN system according to band plans for each country and each area.

Use Case 3 is a use case aiming at outdoor extended range hotspot communication such as extended home coverage, campus wide coverage, or shopping malls and aiming at distributing overloaded cellular traffic by supporting traffic offloading of cellular mobile communication FIG. 6 is a view illustrating an example of channelization of an M2M WLAN system according to band plans for each country and each area.

Referring to FIG. 6, it can be seen that, available frequency bands in a band below 1 GHz are different in each country and each area, so various types of channelizations may be applied. In case of the US having the largest available frequency bands, it can be seen that when a minimum band width is determined to be 1 MHz, up to 16 MHz channel bandwidth may be used. In this manner, in the M2M WLAN system, data is transmitted and received by using a very small channel bandwidth, in comparison with an existing WLAN system.

Meanwhile, in an environment in which a BBS in which a service is provided by an AP has large coverage and a plurality of STAs are connected, narrow-channel transmission may be effective to maximize utilization of a limited spectrum as illustrated in FIG. 6. However, operating the entire BSS by a single narrowband channel may aggravate interference and fading risk.

A frequency selective channel access mechanism may be required in a narrowband frequency environment like a WLAN system.

Figure 7:
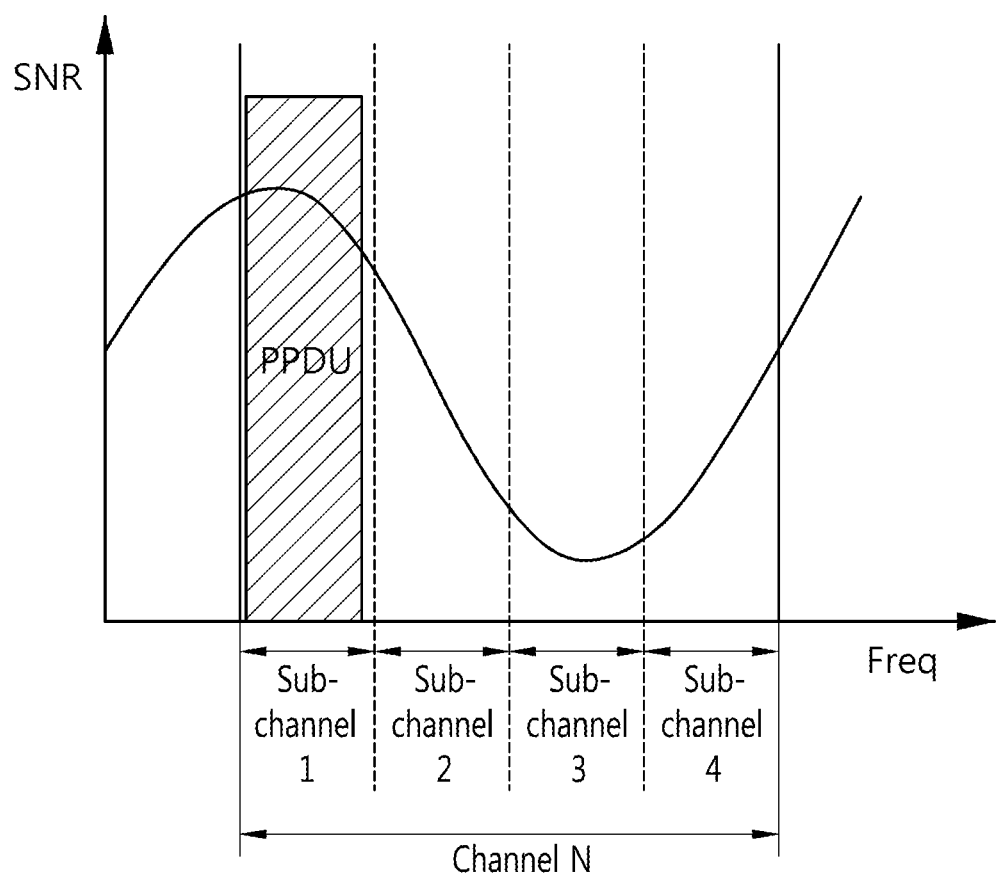
FIG. 7 is a view illustrating a concept of a frequency selective channel access mechanism in a narrowband frequency environment of an M2M WLAN system according to an embodiment of the present invention.

FIG. 7 is a view illustrating a concept of a frequency selective channel access mechanism in a narrowband frequency environment of an M2M WLAN system according to an embodiment of the present invention.

The frequency selective channel access mechanism refers to selectively transmitting a sub-channel having the best SNR in a case in which SNRs of sub-channels are significantly different.

Referring to FIG. 7, a channel N corresponds to an 8 MHz channel including four 2 MHz sub-channels. It can be seen that SNRs of the four sub-channels are significantly different. In this case, it can be seen that, preferably, a PPDU is transmitted by using a sub-channel 1 having the highest SNR.

In order for the transmission and reception method on the basis of the frequency selective channel access to be applied to a WLAN system, a procedure for selecting a sub-channel having the highest SNR among a plurality of sub-channels is required. In detail, a process in which each STA reports channel quality of each sub-channel to an AP and the AP selectively allocates the best channel to each STA is required.

Thus, the present invention proposes a method of allocating the best available sub-channel by an AP to transmit a data frame to each STA, and transmitting a data frame to one or more STAs in an environment in which a BSS is operated with a relatively large BSS bandwidth. In transmitting a data frame to at least one STA, a downlink-frequency division multiple access (DL-FDMA) type data frame may be transmitted. Namely, DL traffic may be transmitted in the form of DL-FDMA in every sub-channel from an AP, but an STA transmits a frame for UL traffic in a specific allocated sub-channel.

Figure 8:
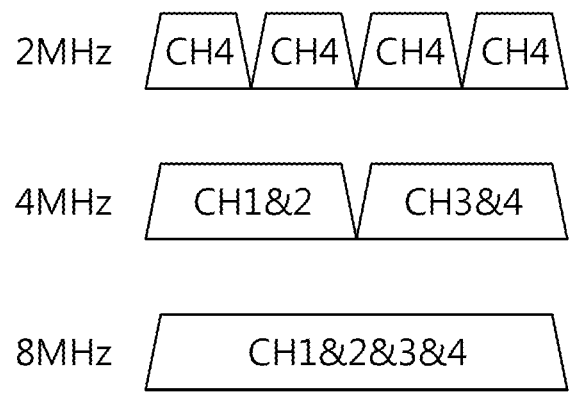
FIG. 8 is a view illustrating an example o channels used in a WLAN system according to an embodiment of the present invention.

FIG. 8 is a view illustrating an example o channels used in a WLAN system according to an embodiment of the present invention.

Referring to FIG. 8, each sub-channel, CH1, CH2, CH3, or CH4 may designate a different 2 MHz channel by itself. Also, for example, CH1 & CH2 designate a 4 MHz channel adding CH1 and CH2. CH1 & CH2 & CH3 & CH4 designates an 8 MHz channel adding all of the CH1 to CH4. The use case of the channels illustrated in FIG. 8 is merely illustrative for the description purpose, and the DL-FDMA mechanism proposed in the present invention may be extendedly applied even to a general different channelization. In particular, the designated sub-channels may be used as is for non-contiguous channels. For example, the DL-FDMA transmission proposed in the present invention may be available even for a non-contiguous 4 MHz channel of CH1 & CH3.

Hereinafter, a frame transmission and reception method on the basis of DL-FDMA in the foregoing channel situation will be descried.

Figure 9:
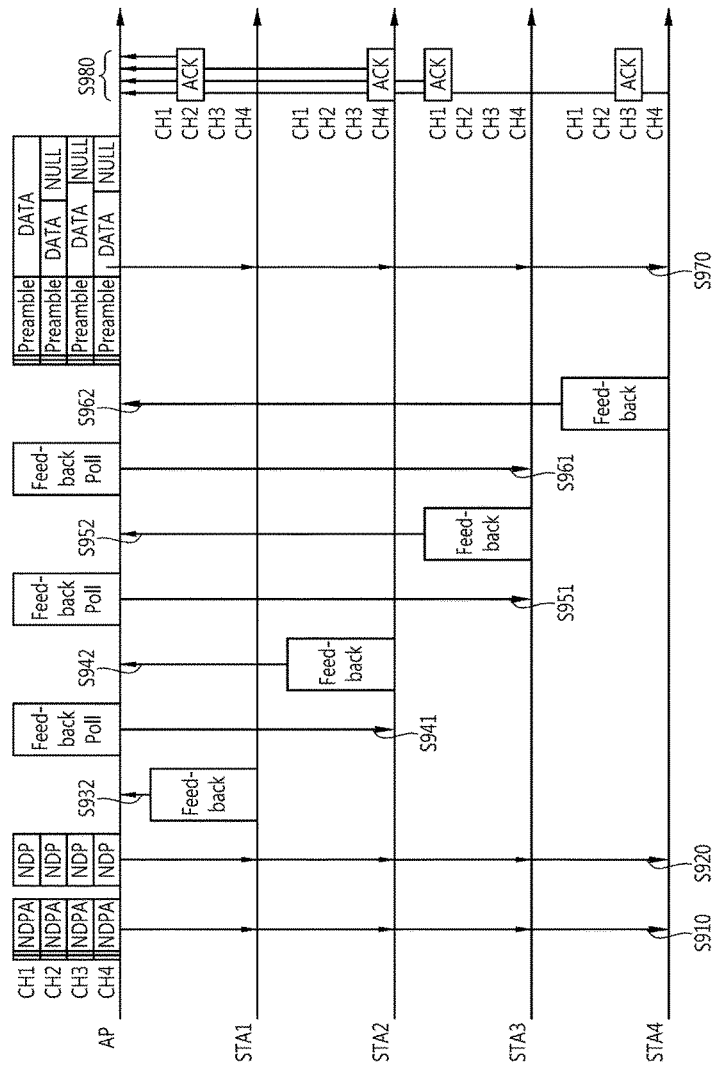
FIG. 9 is a view illustrating a DL-FDMA-based frame transmission and reception method according to an embodiment of the present invention.

FIG. 9 is a view illustrating a DL-FDMA-based frame transmission and reception method according to an embodiment of the present invention.

Referring to FIG. 9, an AP performs contention for a channel access with respect to the entire 8 MHz band, and acquires authority to access the corresponding band.

The AP transmits an NDPA frame indicating an NDP transmission (S910). The NDPA frame is transmitted in a four duplicated PPDU format by 2 MHz sub-channel unit. Like the NDP-based channel sounding method as described above with reference to FIG. 5, the NDPA frame includes information for identifying an STA which is to estimate a channel and transmit a feedback frame including channel state information to the AP. Namely, information indicating STAs which are to respond with respect to the NDP is included. The information indicating STAs may include an indicator indicating a group of STAs or an indicator indicating an individual STA. The indicator indicating an individual STA may be a portion of the entirety of an AID of the corresponding STA.

The AP transmits an NDP frame after the NDPA frame (S920). Like the NDPA, the NDP is transmitted in a four duplicated PPDU format by 2 MHz sub-channel unit. Each STA may estimate channel state information on the basis of the NDP to acquire channel state information.

When NDP transmission is finished, after the lapse of a particular interval such as a short interframe space (SIFS), the STA1, which has been determined to respond first with respect to the NDP, transmits a feedback frame including channel state information to the AP (S932). The channel state information delivered to the AP through the feedback frame may be implemented as shown in Table 3 and Table 4. The delivered channel state information includes information regarding a beamforming feedback matrix V by each subcarrier index and information regarding an average SNR by each spatial stream. Also, the channel state information may include channel related information by 2 MHz sub-channels. Namely, the channel state information may include information related to an average SNR value of each 2 MHz sub-channel.

When the AP receives the feedback frame, the AP may determine a channel to be used for transmission of a data frame to the STA1 on the basis of the channel state information included in the feedback frame received from the STA1. The AP may determine that a sub-channel having the highest SNR value estimated by the STA1 will be allocated to the STA1. Alternatively, the AP may determine that a sub-channel having an SNR value estimated by the STA1 equal to or greater than a particular threshold value will be allocated to the STA1. Hereinafter, the foregoing method may also be applied to receiving feedback frames from STA2 to STA4 and determining a sub-channel to be allocated to the corresponding STAs.

When the AP determines that all of the CH1 to CH4 are to be used in transmitting a data frame to the STA1, the AP may not perform polling to receive a feedback frame from the other STAs (STA2, STA3 and/or STA4).

In a case in which the AP determines to transmit a data frame by using a particular sub-channel among the CH1 to CH4, the AP may perform polling through feedback poll frame transmission. The AP transmits a feedback poll frame requesting transmission of a feedback frame including channel state information to the STA2 (S941). The STA2 transmits a feedback frame to the AP in response to the feedback poll frame (S942).

When the AP determines to allocate all of sub-channels, excluding a sub-channel which has been allocated to the STA1, to the STA2 to transmit a data frame, the AP may terminate polling. However, in a case in which the AP determines to allocate some sub-channels to transmit a data frame, the AP transmits a feedback poll frame requesting transmission of a feedback frame including channel state information to the STA3 (S951). The STA2 transmits a feedback frame to the AP in response to the feedback poll frame (S952).

In a case in which the AP determines to allocate all of the sub-channels, excluding sub-channels allocated to the STA1 and STA2, to transmit a data frame, the AP may terminate polling. Meanwhile, in a case in which the AP determines to allocate some sub-channels to transmit a data frame, the AP transmits a feedback poll frame requesting transmission of a feedback frame including channel state information to the STA4 (S961). The STA4 transmits a feedback frame to the AP in response to the feedback poll frame (S962).

The feedback poll frames transmitted by the AP and the feedback frames transmitted by the respective STAs may be transmitted through the entire channel band in which the NDPA frame and the NDP were transmitted. The feedback poll frames and the feedback frames may be transmitted in an 80 MHz PPDU or may be transmitted in a 80 MHz duplicated PPDU format.

Allocating sub-channels to respective STAs belonging to a particular STA group through the foregoing method may be variously implemented. However, in the present embodiment, it is assumed that the STA1 is allocated CH2, the STA2 is allocated CH4, the STA3 is allocated CHL and the STA4 is allocated CH3.

After determining the best sub-channels for the respective STAs, the AP acquires authority to access the entire band of 8 MHz through contention, and transmits a PPDU to the STA1 to STA4 in a DL-FDMA transmission manner (S970). Transmitting a PPDU in the DL-FDMA transmission manner refers to transmitting different data frames to the respective STAs by channels allocated to the respective STAs. In a case in which transmission lengths of data frames intended to be transmitted to the STAs are not equal, a length of the PPDU is adjusted on the basis of a length of the longest data frame. Namely, in a case in which a length of a data frame intended to be transmitted to a particular STA through a particular channel is shorter than a length of a reference data frame, null padding may be performed as much as the insufficient length.

Sub-channel allocation information indicating sub-channels allocated to respective STAs may be included in a preamble part of the DL-FDMA PPDU. Namely, by indicating to which STA a data frame of each sub-channel is data intended to be transmitted thereafter in the preamble part, the STAs, which have responded to the NDP by a feedback frame previously, may check which sub-channel they have been allocated. Thus, thereafter, each STA may decode only the corresponding sub-channel portion allocated thereto to acquire data.

The sub-channel allocation information may be implemented such that a 3-bit sequence allocated to each STA indicates which CH a corresponding STA has been allocated. In detail, the sub-channel allocation information may be implemented as shown in Table 5.

TABLE 5

| Set value | Meaning |
| --- | --- |
| 0 | Sub-channel is not allocated |
| 1 | CH1 is allocated |
| 2 | CH2 is allocated |
| 3 | CH3 is allocated |
| 4 | CH4 is allocated |
| 5 | CH1 and CH2 are allocated |
| 6 | CH3 and CH4 are allocated |
| 7 | CH1, CH2, CH3, and CH4 are allocated |

When the channel allocation information implemented as described above is included in a preamble with respect to each STA, a bit space totaling 12 bits is required. Namely, channel allocation information with respect to STAs may be implemented as a 12-bit sequence in a preamble. However, such an implementation of the channel allocation information is merely an example and, more bits may be allocated to each STA in a case in which sub-channels are desired to be variously allocated, and less bits may be allocated in a case in which sub-channels are desired to be allocated simply. Also, in the example of channel allocation of Table 5, in a case in which two or more sub-channels are allocated, the sub-channels are contiguous, but noncontiguous sub-channels may also be allocated.

After the PPDU transmission is completed, after a particular interval such as SIFS, the STA transmits an ACK frame through a sub-channel allocated thereto (S980). The STA1 and STA4 simultaneously transmit an ACK frame after receiving the PPDU. Accordingly, the PPDU transmission and reception through the DL-FDMA transmission technique is terminated. If the AP fails to receive an ACK from a particular STA, the AP may re-transmit a data frame through a sub-channel allocated to the particular STA.

Meanwhile, allocating of a sub-channel to an STA in the data frame transmission and reception method on the basis of the DL-FDMA transmission technique as described above may also be performed through a method other than the channel sounding as described above. In the embodiment of FIG. 9, a channel allocated to an STA is determined by the AP, but a channel requested to be allocated may be determined by an STA and information regarding the corresponding channel may be signaled to the AP. In this case, the AP may transmit a data frame on the basis of channel allocation information received from the STA.

Determining a sub-channel to be allocated to each STA may be implemented by exchanging RTS-CTS frames. The AP transmits an RTS frame to a particular STA through an entire channel band. The RTS frame may be transmitted in a PPDU format duplicated by sub-channel unit. Upon receiving the RTS frame, an STA may signal a sub-channel having the highest SNR value or one or more sub-channels exceeding a particular SNR threshold value to the AP. To this end, the STA transmits a CTS frame having a duplicated PPDU format to the AP. An individual CTS frame transmitted in a sub-channel requested to be allocated by the STA may be transmitted together with information indicating that the corresponding sub-channel is a sub-frame requested to be allocated by the STA. The indication information may be implemented by a 1-bit indication bit indicating whether allocation has been requested. The indication information may be included in an initial scrambling sequence on the basis of which the individual CTS frame is scrambled.

The AP may perform an RTS-CTS frame exchanging process on one or more STAs. Thus, the AP may acquire information regarding sub-channels requested to be allocated from the one or more STAs. The AP may allocate sub-channels to each STA on the basis of the acquired information and transmit a data frame through the DL-FDMA transmission technique. Providing information regarding an allocated sub-channel and transmitting a PPDU according to the DL-FDMA transmission technique may be implemented as described above with reference to FIG. 9.

Figure 10:
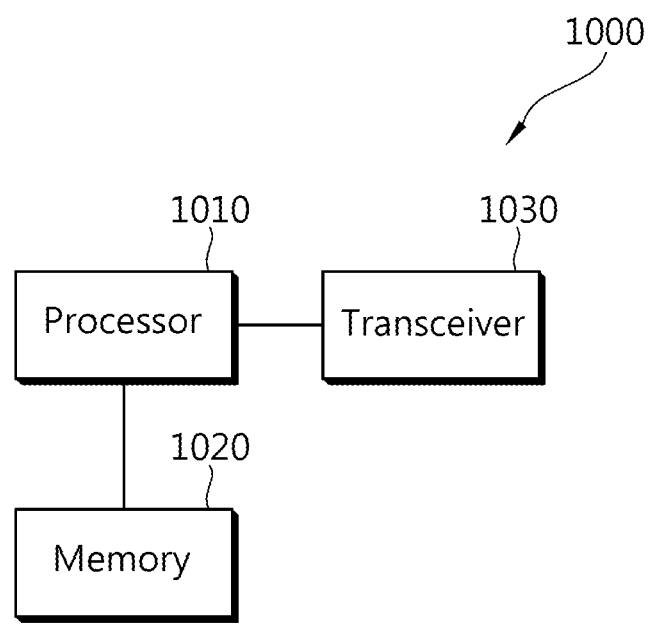
FIG. 10 is a block diagram of a wireless device to which an embodiment of the present invention is applicable.

FIG. 10 is a block diagram of a wireless device to which an embodiment of the present invention is applicable. The wireless device may be an AP or an STA.

A wireless device 1000 may include a processor 1010, a memory 1020, and a transceiver 1030. The transceiver 1030 transmits and receives a radio signal and implements a physical layer of IEEE 802.11. The processor 1010 is functionally connected to the transceiver 1030 to implement a MAC layer and a physical layer of IEEE 802.11. The processor 1010 is set to implement a data frame transmission and reception method on the basis of a channel access mechanism according to an embodiment of the present invention. The processor 1010 may set to determine a sub-channel to be assigned to a specific recipient through an NDP sounding method. The processor 1010 may be set to transmit a data frame according to a DL-FDMA transmission technique through assigned sub-channels. The processor 1010 may be set to include information regarding the assigned sub-channels in a preamble part of a PPDU and transmit the same to a recipient. The processor 1010 may be set to implement the embodiment of the present invention as described above with reference to FIGS. 6 through 9.

The processor 1010 may include an ASIC (Application-Specific Integrated Circuit), a chip set, a logical circuit, and/or a data processing device. The memory 1020 may include a ROM (Read-Only Memory), a RAM (Random Access Memory), a flash memory, a memory card, a storage medium, and/or any other storage devices. When the embodiment is implemented by software, the foregoing techniques may be implemented as modules (processes, functions, and the like) performing the foregoing functions. The module may be stored in the memory 1020 and executed by the processor 1020. The memory 1020 may be provided within or outside the processor 1010 or may be connected to the processor 1010 through a well-known unit.

What is claimed is:

1. A method for communicating in a wireless local area network, the method comprising:
    transmitting, by an access point (AP), a first frame including allowed channel information to a wireless station associated with the access point, the allowed channel information indicating whether at least one sub-channel among available sub-channels is allowed for transmission to the wireless station, wherein each sub-channel has a 2 MHz bandwidth, wherein the first frame occupies the available sub-channels; and
    receiving, by the AP, a second frame on at least one operating channel from the wireless station,
    wherein the at least one operating channel is selected based on the allowed channel information and a result of channel sounding process performed with the wireless station, wherein the channel sounding process is initiated by transmitting a plurality of sounding frames to the wireless station, wherein the plurality of sounding frames are transmitted in a duplicated physical layer protocol data unit (PPDU) format by a 2 MHz sub-channel unit, wherein the plurality of sounding frames are transmitted on different sub-channels during a same time duration,
    wherein the first frame, the second, and the plurality of sounding frames are transmitted in a frequency band below 1 GHz.

2. The method of claim 1, wherein the plurality sounding frames include null data packet (NDP) frames.

3. An access point operating in a wireless local area network system, the access point comprising:
    a transceiver that transmits and receives frames; and
    a processor operably coupled to the transceiver, wherein the processor controls the transceiver to:
    transmit a first frame including allowed channel information to a wireless station associated with the access point, the allowed channel information indicating whether at least one sub-channel among available sub-channels is allowed for transmission to the wireless station, wherein each sub-channel has a 2 MHz bandwidth, wherein the first frame occupies the available sub-channels; and
    receive a second frame on at least one operating channel from the wireless station,
    wherein the at least one operating channel is selected based on the allowed channel information and a result of channel sounding process performed with the wireless station, wherein the channel sounding process is initiated by transmitting a plurality of sounding frames to the wireless station, wherein the plurality of sounding frames are transmitted in a duplicated physical layer protocol data unit (PPDU) format by a 2 MHz sub-channel unit, wherein the plurality of sounding frames are transmitted on different sub-channels during a same time duration, wherein the first frame, the second, and the plurality of sounding frames are transmitted in a frequency band below 1 GHz.

4. The access point of claim 3, wherein the plurality sounding frames include null data packet (NDP) frames.

* * * * *